July 21, 1942. J. E. VAUGHAN Re. 22,143

ELECTRIC FENCE

Original Filed Aug. 28, 1937

Inventor
John E. Vaughan
By Ira Milton Jones
Attorney

Reissued July 21, 1942

Re. 22,143

UNITED STATES PATENT OFFICE 22,143

ELECTRIC FENCE

John E. Vaughan, Milwaukee, Wis., assignor to Prime Manufacturing Company, Milwaukee, Wis., a corporation of Wisconsin Original No. 2,198,358, dated April 23, 1940, Serial No. 161,419, August 28, 1937. Application for reissue May 9, 1941, Serial No. 392,743

4 Claims. (Cl. 256—10)

This invention relates to electric fences of the type now generally used for cattle enclosures and the like.

For the sake of safety, electric fences are intermittently charged, as continued or constant energization may so shock an animal as to render it helpless to move away from the fence. Every effort is therefore made to insure intermittent energization and preclude continued or uninterrupted application of current to the fence.

To this end, the present invention provides means for completely disconnecting the fence from the source of electrical energy in the event that the mechanism used to provide the intermittent energization fails and allows current to flow out on the fence for longer than a predetermined short interval.

Another object of this invention is to provide a switch in the energizing circuit of the fence which is held closed by means of a thermostatic latch adapted to be opened upon uninterrupted flow of current in the energizing circuit for longer than a predetermined short interval.

Another object of this invention resides in the provision of novel means for closing the switch after the latch has permitted it to open, which is so designed that the switch cannot be manually held closed.

Still another object of this invention resides in the provision of a novel manner of mounting the switch and its thermostatic latch.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which.

Figure 1:
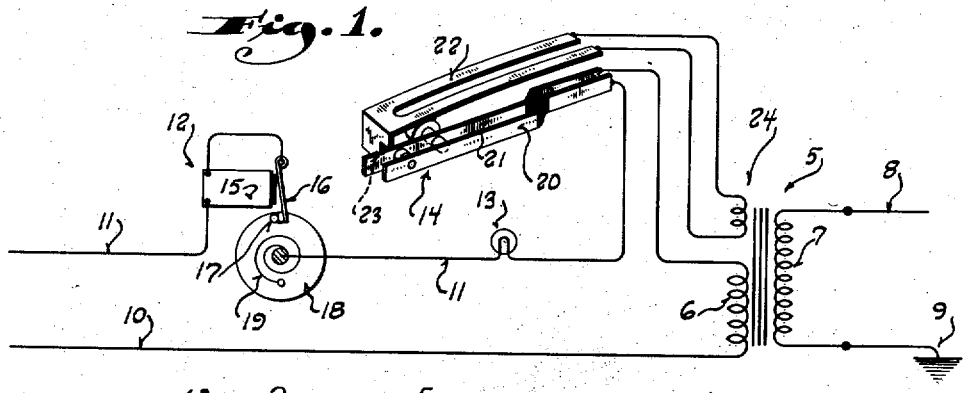
Figure 1 is a diagrammatic view illustrating one complete embodiment of this invention.

Referring now particularly to the accompanying drawing in which like numerals indicate like parts, the numeral 5 designates a transformer having a primary 6 and a secondary 7. One side of the secondary is connected to the fence 8 to be charged and its other side is grounded as at 9. The primary 6 is connected with a source of alternating current through a conductor 10 and a conductor 11 in which a "chopper," or make-and-break device 12; a signal light 13; and a switch 14 are connected in series so that current can flow through the primary 6 only when the switch 14 is closed and at the dictation of the "chopper."

The "chopper" 12 may be of any suitable design and construction, and in the present instance is illustrated as comprising an electromagnet 15 having its coil connected in series in the conductor 11 with one side thereof connected to an armature 16 mounted in magnetic relation to the electromagnet. The armature carries a contact which is engageable with a contact 17 mounted on a wheel 18 which is yieldingly urged in a clockwise direction by a spiral spring 19 to engage its contact 17 with the contact of the armature.

The contact 17 is electrically connected with the conductor 11 through the wheel 18, as shown. Upon energization of the electromagnet 15, the attraction of its armature 16 "kicks" the contact 17 away from it to break the circuit, and the spring 19 returns it into engagement. In this manner, the primary circuit is normally intermittently opened and closed, as indicated by the signal light 13.

In the event of failure of the "chopper," or, as is sometimes done, the locking of the "chopper" in a circuit closing position, it is desirable to open the primary circuit to preclude continued energization of the fence, and it is to this end that the switch 14 is provided.

This switch comprises two spring blades 20 and 21 rigidly mounted at one end and carrying contacts at their outer free ends. The blades are sprung so that their normal resiliency holds their contacts apart and thus leaves the switch open. It is held closed to complete the primary circuit by means of a thermostatic latch 22.

This latch consists of a substantially U-shaped strip of bimetal having its closed end bent at right angles and notched as at 23 to engage the spring blade 21. The location of the notch 23 with relation to the blade 21 is such that when properly engaged with the blade, it holds the same in a position at which the switch contacts are engaged.

A filament winding 24 in the transformer provides means for passing current through the bimetallic latch and heating it whenever the primary circuit remains closed for longer than a predetermined period of time. The potential built up in the filament winding is sufficient to heat the thermostatic latch and flex it away from the spring blades and thus allow the switch to open.

It will thus be readily apparent that the provision of the switch and its thermal latch positively precludes continued energization of the fence, and inasmuch as the filament winding is fixed and not adjustable, the user cannot alter the time in which response of the thermal latch is obtained.

Figure 2:
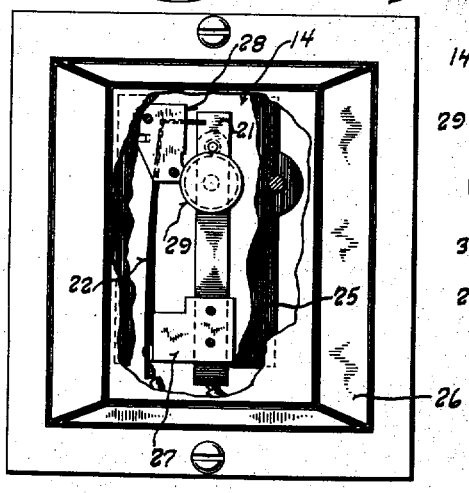
Figure 2 is a front view of the transformer used for energizing the fence with part of its cover broken away to show the manner in which the switch and latch are mounted.
Figure 3:
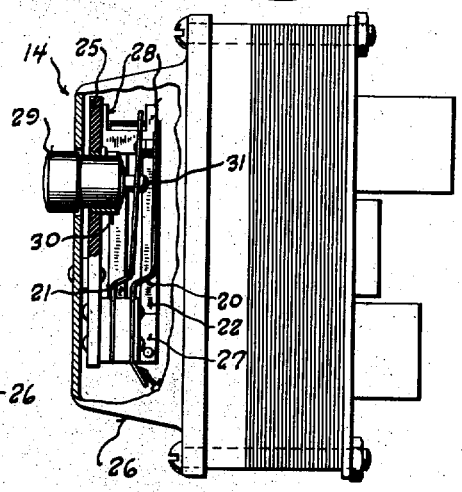
Figure 3 is a side view of the transformer to illustrate the mounting of the switch and latch.
Figure 4:
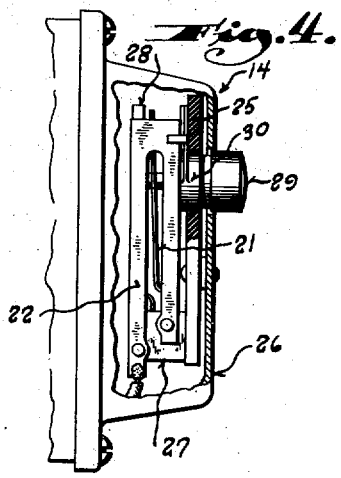
Figure 4 is a side view illustrating the opposite side of the transformer.
Figure 5:
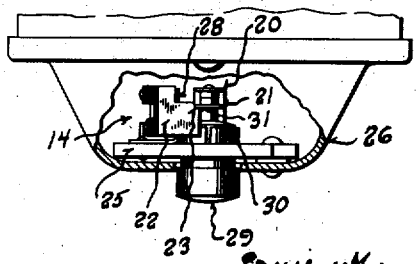
Figure 5 is a top view of this portion of the transformer.

While a separate mounting may be provided for the switch and its latch, it is desirable to mount these elements in the housing or cover of the transformer, as shown in Figures 2 to 5, inclusive. For this purpose, a panel of insulating material 25 is riveted or otherwise secured to the inner face of the cover 26 of the transformer and on this panel the switch blades 20 and 21 are mounted. The bimetallic latch 22 is also mounted on the panel by means of a block of insulating material 27.

The outer free end of the bimetallic latch member is guided by the spaced arms 28 of a bifurcated stamping secured to the mounting panel.

Mounting the switch and the bimetallic latch member in this manner has the advantage of quickly carrying off the heat generated by the passage of current through the latch member, as the thin metal walls of the cover 26, on which the latch member is mounted, but electrically insulated therefrom, afford an excellent medium for carrying off the heat.

To reset the switch after it has tripped, a resetting button 29 projects through the cover of the transformer and is slidably guided in a bushing 30 carried by the panel 25. The inner end of the button 29 has a pin 31 projecting therefrom which extends through a hole in the switch blade 21 to engage the blade 20 upon depression and move the same away from the blade 21. Consequently, during the resetting of the switch, the switch contacts are manually held against closure and it is only by engaging the free end of the blade 21 with the notch 23 on the thermal latch and permitting the button 29 to project freely from the transformer casing that closure of the switch is possible. Hence, it will be seen that it is impossible to manually defeat the protection afforded by the switch and its thermal latch.

From the foregoing description taken in connection with the accompanying drawing, it will be readily apparent to those skilled in the art, that this invention provides simple and efficient means for guarding against continued energization of an electric fence, by positively opening the energizing circuit whenever current flows therein for longer than a predetermined period of time, or when excessive voltage is applied to the transformer primary for shorter periods of time.

What I claim as my invention is:

1. In combination with an electric fence, means for energizing the fence comprising: a transformer having a primary; a circuit for connecting the primary with a source of electrical energy; a make-and-break device in said circuit to intermittently open and close the same; a switch in the circuit biased to open position; a thermostatic latch for holding the switch closed and adapted upon being heated to release the switch for opening; and a permanently closed heating circuit connected directly with the thermostatic latch and energized from the primary to be effective whenever the primary circuit remains closed for longer than a predetermined short time to trip the latch.

2. In combination with an electric fence, means for energizing the fence comprising: a transformer having a primary winding; a primary circuit for connecting the primary winding with a source of electrical energy; means for intermittently opening and closing said primary circuit; a switch connected in the primary circuit and biased to an open position; a bimetallic latch for holding said switch closed and adapted upon being heated to trip and release the switch for opening; a winding arranged inductively to the primary winding of the transformer; and means directly connecting said bimetallic latch with the ends of said winding so that current induced in said winding flows through the latch to heat the same.

3. An electric fence controller having means for intermittently and momentarily energizing a fence wire comprising: a transformer; transformer coupled primary and secondary circuits, the primary circuit being connectible with a source of electrical energy and the secondary circuit being adapted to energize a fence wire; a circuit interrupter in the primary circuit for periodically opening and closing the same to effect intermittent and momentary energization of the fence wire; a switch in one of said circuits biased to an open position rendering the controller ineffective to energize the fence wire; a latch for releasably holding the switch closed; current responsive latch releasing means operable in response to the flow of current therethrough for longer than a predetermined time to release the latch and allow the switch to open; and a permanently closed circuit having said current responsive latch releasing means connected therein, said permanetly closed circuit being energized from a winding of the transformer so as to be energized as long as the primary circuit is closed and connected with its source of electric energy so that closure of the primary circuit for longer than a predetermined time results in tripping of the latch.

4. An electric fence controller having means for intermittently and momentarily energizing a fence wire comprising: a transformer; transformer coupled primary and secondary circuits, the primary circuit being connectible with a source of electrical energy and the secondary circuit being adapted to energize a fence wire; a circuit interrupter in the primary circuit for periodically opening and closing the same to effect intermittent and momentary energization of the fence wire; a switch in one of said circuits biased to an open position rendering the control ineffective to energize the fence wire; a thermostatic latch for releasably holding the switch closed and operable upon reaching a predetermined temperature to release the switch for opening; and a permanently closed heating circuit for raising the temperature of the latch to the degree at which it trips in the event of current flow in said heating circuit for longer than a predetermined time, said heating circuit being energized from a winding of the transformer so as to be energized as long as the primary circuit is closed and connected with its source of electrical energy whereby closure of the primary circuit for longer than a predetermined time results in tripping of the latch.

JOHN E. VAUGHAN.